US012201861B2

United States Patent
Geissler et al.

(10) Patent No.: US 12,201,861 B2
(45) Date of Patent: Jan. 21, 2025

(54) VEHICLE WITH A HIGH-VOLTAGE STORE, AND HIGH-VOLTAGE STORE

(71) Applicant: Bayerische Motoren Werke Aktiengesellschaft, Munich (DE)

(72) Inventors: Norman Geissler, Munich (DE); Daniel Hielscher, Germering (DE); Maximilian Rampf, Altomuenster (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 782 days.

(21) Appl. No.: 17/284,146

(22) PCT Filed: Sep. 25, 2019

(86) PCT No.: PCT/EP2019/075786
§ 371 (c)(1),
(2) Date: Apr. 9, 2021

(87) PCT Pub. No.: WO2020/074255
PCT Pub. Date: Apr. 16, 2020

(65) Prior Publication Data
US 2021/0331011 A1    Oct. 28, 2021

(30) Foreign Application Priority Data

Oct. 11, 2018  (DE) ............... 10 2018 125 103.3

(51) Int. Cl.
*A62C 3/07*     (2006.01)
*A62C 3/16*     (2006.01)
(Continued)

(52) U.S. Cl.
CPC .............. *A62C 3/07* (2013.01); *A62C 3/16* (2013.01); *B60K 1/04* (2013.01); *B60L 50/66* (2019.02);
(Continued)

(58) Field of Classification Search
CPC .. A62C 3/07; A62C 3/16; A62C 2/247; A62C 2/065; A62C 35/02; A62C 35/68;
(Continued)

(56) References Cited

U.S. PATENT DOCUMENTS

| 2012/0111444 A1* | 5/2012 | Hermann .......... H01M 10/6567 |
| | | 429/120 |
| 2016/0346573 A1 | 12/2016 | Carson et al. |

FOREIGN PATENT DOCUMENTS

| CN | 203001742 U | 6/2013 |
| DE | 10 2014 011 609 A1 | 3/2015 |

(Continued)

OTHER PUBLICATIONS

Chinese-language Office Action issued in Chinese Application No. 201980051059.4 dated Mar. 25, 2022 with English translation (17 pages).

(Continued)

*Primary Examiner* — Christopher R Dandridge
(74) *Attorney, Agent, or Firm* — Crowell & Moring LLP

(57) ABSTRACT

A vehicle with a high-voltage store which has a high-voltage-store housing in which a plurality of electrical storage cells are arranged, wherein the vehicle is provided with a fire-extinguishing route which is provided and intended to permit fire-extinguishing agent to be supplied in the event of a fire or in the event of risk of a fire to the high-voltage-store housing and/or into the interior of the high-voltage-store housing, wherein, when in the correct state of the high-voltage store, the fire-extinguishing route is closed or covered by a covering element which is arranged on an outer side of the vehicle.

11 Claims, 1 Drawing Sheet

(51) Int. Cl.
  *B60K 1/04* (2019.01)
  *B60L 50/60* (2019.01)
  *H01M 50/143* (2021.01)

(52) U.S. Cl.
  CPC ... *H01M 50/143* (2021.01); *B60K 2001/0438* (2013.01)

(58) Field of Classification Search
  CPC ........... A62C 35/13; A62C 35/00; A62C 3/00; A62C 3/0292; A62C 99/0018; B05B 15/00
  See application file for complete search history.

(56) References Cited

FOREIGN PATENT DOCUMENTS

| DE | 10 2013 021 416 | A1 | | 6/2015 | |
|---|---|---|---|---|---|
| DE | 10 2015 220 601 | A1 | | 4/2017 | |
| DE | 102016224473 | A1 | * | 6/2018 | ............... A62C 3/16 |
| FR | 2991258 | A1 | * | 12/2013 | ............... A62C 3/07 |
| WO | WO-2016055708 | A1 | * | 4/2016 | .......... H01M 10/625 |

OTHER PUBLICATIONS

International Search Report (PCT/ISA/210) issued in PCT Application No. PCT/EP2019/075786 dated Dec. 19, 2019 with English translation (five (5) pages).

German-language Written Opinion (PCT/ISA/237) issued in PCT Application No. PCT/EP2019/075786 dated Dec. 19, 2019 (five (5) pages).

German-language Search Report issued in German Application No. 10 2018 125 103.3 dated Jun. 13, 2019 with partial English translation (13 pages).

Chinese-language Office Action issued in Chinese Application No. 201980051059.4 dated Aug. 18, 2021 with English translation (16 pages).

* cited by examiner

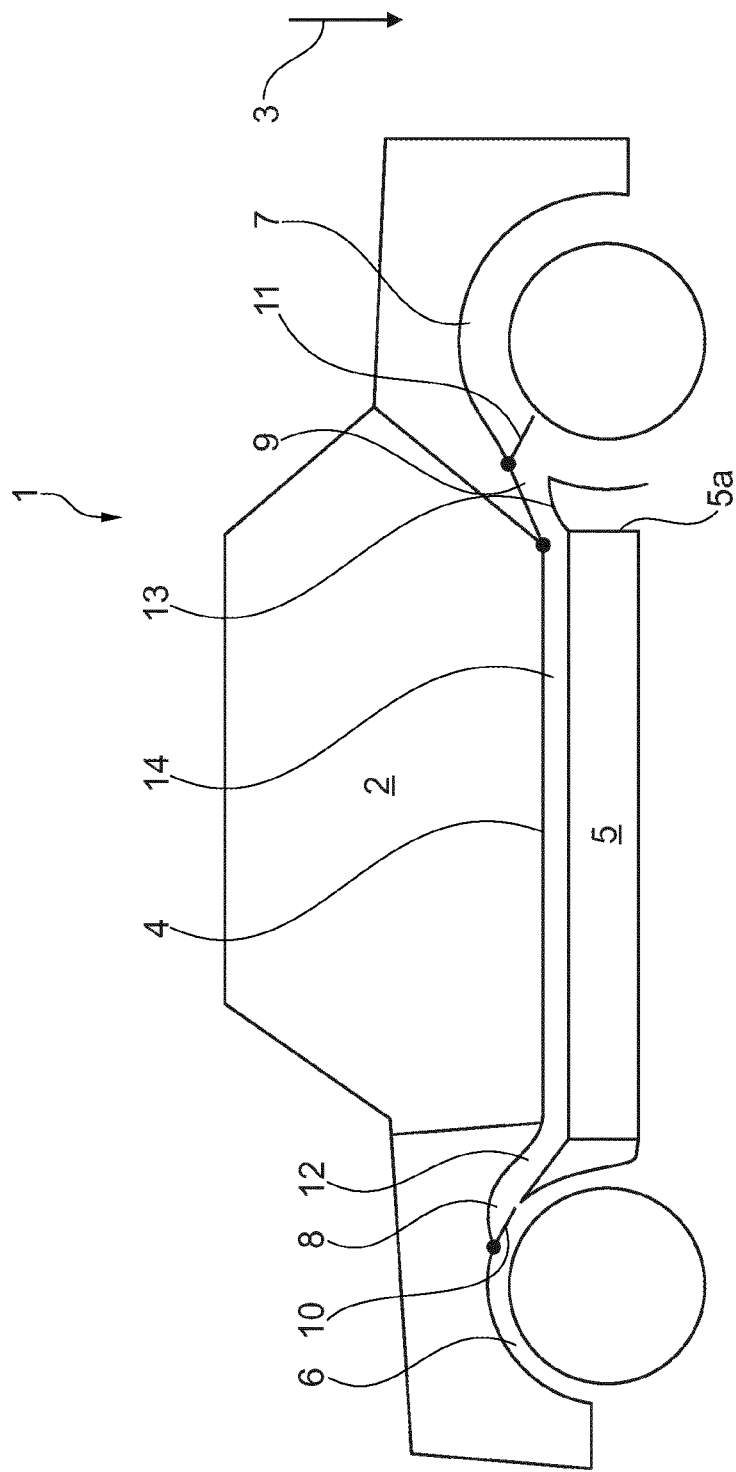

VEHICLE WITH A HIGH-VOLTAGE STORE, AND HIGH-VOLTAGE STORE

BACKGROUND AND SUMMARY OF THE INVENTION

The present invention relates to a vehicle having a high-voltage store, and to a high-voltage store.

Vehicles having an electric drive, particularly exclusively electrically powered vehicles and hybrid vehicles, comprise a high-voltage store having a high-voltage store housing, in which a plurality of electrical storage cells, customarily lithium-ion cells, are arranged. In the event of extremely severe accidents, for example, damage may be sustained by the high-voltage store, or by the individual electrical storage cells which are arranged therein. In extremely rare cases, this can result in internal cell short-circuiting, with a consequent rise in pressure and temperature in the interior of individual storage cells. Although highly improbable, this might, in extreme cases, lead to off-gassing from individual battery cells, or to the occurrence of battery fires.

The object of the invention is the provision of a vehicle with a high-voltage store and of a corresponding high-voltage store which feature improved safety with respect to "fire-fighting facilities."

This object is fulfilled by the features of the independent patent claims. Advantageous configurations and further developments of the invention can be gathered from the dependent claims.

The starting point of the invention is a vehicle having a high-voltage store which comprises a high-voltage store housing in which, inter alia, a plurality of electrical storage cells and/or storage cell modules constituted of a plurality of storage cells are arranged or can be arranged.

A fundamental concept of the invention involves the provision of an "extinguishing route" on the vehicle, which is designed and intended, in the event of a fire, to permit the supply of a fire-extinguishing agent to the high-voltage store housing and/or into the interior of the high-voltage store housing. When the high-voltage store is in a regulation state, the extinguishing route is closed or covered by a covering element which is arranged on an outer side of the vehicle.

The object of the invention is not only a vehicle having a high-voltage store, but also a high-voltage store per se, which comprises a high-voltage store housing in which a plurality of electrical storage cells are arranged, wherein an extinguishing route is provided on the high-voltage store housing which is designed and intended, in the event of a fire or the risk of a fire, to permit the supply of a fire-extinguishing agent to the interior of the high-voltage store housing, wherein the extinguishing route, in a regulation state of the high-voltage store, is closed or covered by a covering element which is arranged on an outer side of the high voltage store housing. It is expressly indicated that all comments pertaining to the invention also apply to a high-voltage store per se (wherein the latter is not an element of a vehicle).

By means of the extinguishing route according to the invention, under exceptional circumstances in which the high-voltage store is at risk of fire or in which a fire is present, a fire-extinguishing agent can therefore be deliberately directed to or sprayed onto the high-voltage store housing, or admitted or injected into the high-voltage store housing.

In some vehicles, the high-voltage store housing constitutes an underside of the vehicle. In vehicles of this type, in principle, a fire-extinguishing agent can be sprayed from below directly onto the underside of the high-voltage store housing or onto the underside of the vehicle which is constituted by the underside of the high-voltage store housing. However, this is not the intention of the present invention. Instead, it is the intention of the present invention that a fire-extinguishing agent is applied or sprayed onto the high-voltage store housing from the exterior, via a dedicated extinguishing route which is provided in the vehicle for this purpose, and/or that a fire-extinguishing agent is admitted or sprayed into the interior of the high-voltage store housing.

According to a further development of the invention, it is provided that, where the covering element is removed or opened, the extinguishing route is accessible and a fire-extinguishing agent can be conveyed or sprayed via the extinguishing route onto an outer side of the high-voltage store housing and/or into the interior of the high-voltage store housing.

In particular, it can be provided that a fire-extinguishing agent can be conveyed or sprayed from the extinguishing route to an upper outer side of the high-voltage store housing. The term "upper outer side" refers to an upper side of the high-voltage store housing, wherein the term "upper side" is to be understood in relation to gravitational force. It can thus be provided that, from the extinguishing route, fire-extinguishing agent can be conveyed or sprayed directly onto an upper outer side of the high-voltage store housing, in relation to the direction of gravitational force. The upper outer side or upper side of the high-voltage store housing can be arranged, e.g., below the "underfloor" of the vehicle passenger compartment. In conventional electric vehicles, in which the high-voltage store is arranged below the underfloor of the vehicle passenger compartment, no such extinguishing route is provided. Correspondingly, vehicles of this type provide virtually no option for the targeted spraying of a large quantity of fire-extinguishing agent onto the upper side of the high-voltage store housing. By the application or spraying of fire-extinguishing agent onto the upper side of the high-voltage store housing, the temperature thereof in the event of a fire can be significantly reduced, thereby contributing to the containment of an existing fire or to a reduction of the risk of the occurrence of a fire.

According to a further development of the invention, it is provided that the covering element is arranged with a spacing from the high-voltage store housing. For example, it can be provided that the covering element is arranged in an unpainted external region of the vehicle, such as in the region of a wheel arch of the vehicle.

Naturally, it can be provided that the vehicle comprises a plurality of such extinguishing routes, each of which is closed or covered by a covering element. For example, a covering element of this type and an extinguishing route can be provided in each of the four wheel arches. It would, moreover, be conceivable for extinguishing routes of this type to be arranged in the lower sill area, i.e., below the doors, in the fender area or below the fender area, or in the trunk space of the vehicle.

According to a further development of the invention, an extinguishing duct is provided, which runs from a region in which the covering element is provided to the outer side of the high-voltage store housing and/or into the interior of the high-voltage store housing. Via an extinguishing duct of this type, fire-extinguishing agent can thus be sprayed from the exterior onto the high-voltage store housing, or injected into the high-voltage store housing, in a targeted manner.

It is also conceivable that an extinguishing coupling is provided (for example, a "Storz coupling") which, in the regulation state of the high-voltage store, is covered by the covering element. A fire-extinguishing agent hose can be directly connected to an extinguishing coupling of this type such as is known from fire-fighting technology. Accordingly, large quantities of fire-extinguishing agent can be applied to the high-voltage store housing or admitted to the high-voltage store housing in a highly targeted manner.

The covering element is preferably arranged such that it can be removed or opened as easily as possible, i.e., with a limited expenditure of force, and preferably without tools or by the use of very simple implements, such as a screwdriver or similar. The covering element can assume a covering state in which it closes or covers the extinguishing route. In the covering state, it can be provided that the covering element is secured in a screwless arrangement or by means of a clip-fit connection and/or by means of a predetermined breaking point, and is correspondingly removable in a simple manner and with a limited expenditure of force.

By means of the extinguishing route according to the invention or the above-mentioned extinguishing coupling, the fire department can apply water, carbon dioxide or other cooling or fire-extinguishing agents to the high-voltage store housing, or execute the filling of the high-voltage store housing therewith, in a targeted manner. The risk of "thermal runaway" can be significantly reduced accordingly.

The invention is described in greater detail hereinafter, in conjunction with the drawing. The basic principle of the invention is represented in a highly schematic manner in FIG. 1.

BRIEF DESCRIPTION OF THE DRAWINGS

FIG. 1 is a schematic illustration of a vehicle with a high-voltage store according to the present invention.

DETAILED DESCRIPTION OF THE DRAWINGS

FIG. 1 shows a vehicle 1 having a vehicle passenger compartment 2 which—in relation to the direction 3 of gravitational force—is delimited at the lower end by an underfloor 4. A high-voltage store 5, which comprises a high-voltage store housing 5a, is arranged below the vehicle passenger compartment 2 or the underfloor 4. An extinguishing route 8 or 9 is provided in the wheel arches 6, 7 respectively. In the regulation state of the high-voltage store, the extinguishing routes 8, 9 are closed or closable by means of easily removable or foldaway covering elements. The extinguishing route 8 is closed by a covering element 10. The extinguishing route 9 is accessible via a covering element 11 which, in this case, has already been folded away or removed.

In the event of a fire or a temperature increase in the high-voltage store 5 which might result in a fire, a fire-extinguishing agent, such as water, carbon dioxide or similar, can be admitted or injected via the extinguishing routes 8, 9.

As can be seen from FIG. 1, a fluid duct 12 or 13 leads respectively from the extinguishing routes 8, 9 into a region 14 above the high-voltage store 5. In this manner, a cooling fire-extinguishing agent can be directly applied to the upper side of the high-voltage store housing 5a, which upper side is otherwise difficult to access, barely accessible or entirely inaccessible.

What is claimed is:

1. A vehicle comprising:
   a voltage store which includes a voltage store housing, in which a plurality of electrical storage cells are arranged; and
   a plurality of extinguishing routes, each of which is provided in a wheel arch on the vehicle, the extinguishing routes being configured, in case of a fire or a risk of the fire, to supply a fire-extinguishing agent to at least one of an outer side of the voltage store housing and an interior of the voltage store housing,
   wherein each of the extinguishing routes, in a regulation state of the voltage store, is closed or covered by a cover which is arranged on an outer side of the vehicle, and
   wherein the extinguishing routes include a gap extending between a top surface of the voltage store housing and a bottom surface of the vehicle, and two fluid duct surfaces, each extending between at least one of the wheel arches and the top surface of the voltage store housing, the fire-extinguishing agent applied about at least one of the extinguishing duct surfaces, into the gap, to the top surface of the voltage store housing.

2. The vehicle according to claim 1, wherein, when the cover is removed or opened, the extinguishing route is accessible and the fire-extinguishing agent is conveyed via the extinguishing route to at least one of onto the outer side of the voltage store housing and into the interior of the voltage store housing.

3. The vehicle according to claim 1, wherein, from the extinguishing route, the fire-extinguishing agent is conveyed onto an upper outer side of the voltage store housing in relation to a direction of gravitational force.

4. The vehicle according to claim 1, wherein, from the extinguishing route, the fire-extinguishing agent is conveyed directly onto an upper outer side of the voltage store housing in relation to a direction of gravitational force.

5. The vehicle according to claim 1, wherein the cover is arranged with a spacing from the voltage store housing.

6. The vehicle according to claim 1, wherein the cover is arranged in an unpainted outer region of the vehicle.

7. The vehicle according to claim 1, wherein the cover is provided in, or in the region of, the wheel arch of the vehicle.

8. The vehicle according to claim 1, wherein an extinguishing duct is provided, which runs from a region in which the cover is provided to at least one of an outer side of the voltage store housing and into the interior of the voltage store housing.

9. The vehicle according to claim 1, wherein an extinguishing coupling is provided which, in a regulation state of the voltage store, is covered by the cover.

10. The vehicle according to claim 1, wherein the cover assumes a covering state in which the cover closes or covers the extinguishing route, and in the covering state the cover is secured by at least one of a screwless arrangement, a clip-fit connection and a predetermined breaking point.

11. A high-voltage store comprising:
   a voltage store housing, in which a plurality of electrical storage cells are arranged; and
   a plurality of extinguishing routes provided on the voltage store housing which is configured, in case of a fire or a risk of a fire, to permit supply of a fire-extinguishing agent into an interior of the voltage store housing,
   wherein the extinguishing routes, in a regulation state of the voltage store, are closed or covered by a cover which is arranged on an outer side of the voltage store housing,
   wherein the extinguishing routes include a gap extending between a top surface of the voltage store housing and a bottom surface of a vehicle, and two fluid duct surfaces, each extending between at least one wheel arch of the vehicle and the top surface of the voltage store housing, the fire-extinguishing agent applied about at least one of the extinguishing duct surfaces, into the gap, to the top surface of the voltage store housing.

\* \* \* \* \*